United States Patent
Lin

(10) Patent No.: US 9,933,582 B1
(45) Date of Patent: Apr. 3, 2018

(54) OPTICAL FIBER CONNECTOR

(71) Applicant: Yu-Ching Lin, Kaohsiung (TW)

(72) Inventor: Yu-Ching Lin, Kaohsiung (TW)

( * ) Notice: Subject to any disclaimer, the term of this patent is extended or adjusted under 35 U.S.C. 154(b) by 0 days.

(21) Appl. No.: 15/465,959

(22) Filed: Mar. 22, 2017

(30) Foreign Application Priority Data

Nov. 30, 2016 (TW) .............................. 105139463 A

(51) Int. Cl.
  *G02B 6/38* (2006.01)
  *G02B 6/44* (2006.01)

(52) U.S. Cl.
  CPC ......... *G02B 6/3821* (2013.01); *G02B 6/3825* (2013.01); *G02B 6/3883* (2013.01); *G02B 6/3885* (2013.01); *G02B 6/3893* (2013.01); *G02B 6/4403* (2013.01)

(58) Field of Classification Search
  CPC .. G02B 6/3821; G02B 6/3825; G02B 6/3883; G02B 6/3885; G02B 6/3893; G02B 6/4403
  See application file for complete search history.

(56) References Cited

U.S. PATENT DOCUMENTS

| | | | | |
|---|---|---|---|---|
| 2,989,610 A * | 6/1961 | Linton | ................... | H01H 85/32 337/201 |
| 5,028,115 A * | 7/1991 | Grosse-Boes | ........ | G02B 6/3847 385/77 |
| 5,608,828 A * | 3/1997 | Coutts | .................. | G02B 6/3849 385/59 |
| 5,894,110 A * | 4/1999 | Simmons | ................. | H01R 4/22 174/87 |
| 6,315,590 B1 * | 11/2001 | Grois | ................... | G02B 6/3893 439/248 |
| 6,530,696 B1 * | 3/2003 | Ueda | .................... | G02B 6/3893 385/59 |
| 6,572,275 B2 * | 6/2003 | Shimoji | ............... | G02B 6/3821 385/56 |

(Continued)

FOREIGN PATENT DOCUMENTS

CN      103809249 A    5/2014
TW        498980 U    8/2002

*Primary Examiner* — Peter Radkowski
(74) *Attorney, Agent, or Firm* — Rosenberg, Klein & Lee

(57) ABSTRACT

An optical fiber connector according to the present disclosure includes a fiber ferrule, a spring, a coil spring seat and a spring push. An opening extends through the front end of the spring. The spring seat includes two first tooth portions and two second tooth portions. The spring seat has opposing front and rear surfaces. The front surface of the spring comes in contact with the fiber ferrule. An opening extends through the rear surface of the spring. The first tooth portions extend from the rear surface and the respective first tooth portion has a first inner surface and a first outer surface. The first outer surface is a curved surface. The second tooth portions extend from the rear surface and the respective second tooth portion has a second inner surface and a second outer surface. The second outer surface is a curved surface. The first and second tooth portions extend into the opening of the spring and the convex surfaces thereof come in contact with the inner sides of the spring. The spring push comes in contact with the rear end of the spring to push the spring toward the spring seat.

10 Claims, 12 Drawing Sheets

(56) References Cited

U.S. PATENT DOCUMENTS

| | | | | |
|---|---|---|---|---|
| 6,738,557 B2* | 5/2004 | Chang | G02B 6/266 | 385/140 |
| 6,783,281 B2* | 8/2004 | Cheng | G02B 6/3825 | 385/55 |
| 6,856,750 B2* | 2/2005 | Chang | G02B 6/266 | 359/234 |
| 6,873,784 B2* | 3/2005 | Chang | G02B 6/266 | 385/140 |
| 7,077,576 B2* | 7/2006 | Luther | G02B 6/3821 | 385/55 |
| 7,229,220 B2* | 6/2007 | Zhu | G02B 6/4292 | 385/88 |
| 7,264,402 B2* | 9/2007 | Theuerkorn | G02B 6/3821 | 385/53 |
| 7,508,605 B2* | 3/2009 | Nishikawa | G02B 7/102 | 359/694 |
| 7,654,747 B2* | 2/2010 | Theuerkorn | G02B 6/3821 | 385/53 |
| 7,712,971 B2* | 5/2010 | Lee | G02B 6/3855 | 385/62 |
| 7,785,019 B2* | 8/2010 | Lewallen | G02B 6/3817 | 385/53 |
| 8,109,679 B2* | 2/2012 | Danley | G02B 6/3818 | 385/71 |
| 8,132,971 B2* | 3/2012 | Luther | G02B 6/3834 | 385/52 |
| 8,317,409 B2* | 11/2012 | Li | G02B 6/3821 | 385/53 |
| 8,403,569 B2* | 3/2013 | Barnes | G02B 6/245 | 385/137 |
| 8,523,457 B2* | 9/2013 | Liu | G02B 6/3882 | 385/70 |
| 8,622,635 B2* | 1/2014 | Yen | G02B 6/3821 | 385/55 |
| 8,651,749 B2* | 2/2014 | Dainese Jnior | G02B 6/3869 | 385/74 |
| 8,821,034 B2* | 9/2014 | Kwasny | G02B 6/3885 | 385/78 |
| 8,882,363 B2* | 11/2014 | Dong | G02B 6/36 | 385/77 |
| 8,979,395 B2* | 3/2015 | Ott | G02B 6/36 | 385/134 |
| 8,985,864 B2* | 3/2015 | Ott | G02B 6/3825 | 385/70 |
| 8,985,867 B2* | 3/2015 | Ott | G02B 6/3825 | 385/60 |
| 9,490,577 B2* | 11/2016 | Diop | H01R 13/641 | |
| 9,523,824 B2* | 12/2016 | Ott | G02B 6/36 | |
| 2002/0118926 A1* | 8/2002 | Shimoji | G02B 6/3821 | 385/76 |
| 2003/0095779 A1* | 5/2003 | Chang | G02B 6/266 | 385/140 |
| 2003/0095780 A1* | 5/2003 | Chang | G02B 6/266 | 385/140 |
| 2003/0103758 A1* | 6/2003 | Chang | G02B 6/266 | 385/140 |
| 2004/0033028 A1* | 2/2004 | Cheng | G02B 6/3825 | 385/55 |
| 2005/0069264 A1* | 3/2005 | Luther | G02B 6/3821 | 385/59 |
| 2006/0204178 A1* | 9/2006 | Theuerkorn | G02B 6/3821 | 385/59 |
| 2006/0239619 A1* | 10/2006 | Luther | G02B 6/3821 | 385/69 |
| 2007/0025665 A1* | 2/2007 | Dean, Jr. | G02B 6/3869 | 385/78 |
| 2007/0160327 A1* | 7/2007 | Lewallen | G02B 6/3817 | 385/53 |
| 2007/0172172 A1* | 7/2007 | Theuerkorn | G02B 6/3821 | 385/53 |
| 2008/0080815 A1* | 4/2008 | Lee | G02B 6/3858 | 385/62 |
| 2010/0080511 A1* | 4/2010 | Luther | G02B 6/3834 | 385/60 |
| 2010/0129031 A1* | 5/2010 | Danley | G02B 6/3818 | 385/59 |
| 2010/0183265 A1* | 7/2010 | Barnes | G02B 6/245 | 385/77 |
| 2010/0266245 A1* | 10/2010 | Sabo | G02B 6/3825 | 385/79 |
| 2010/0310213 A1* | 12/2010 | Lewallen | G02B 6/3817 | 385/75 |
| 2011/0096323 A1* | 4/2011 | Liu | G02B 6/3882 | 356/73.1 |
| 2011/0158593 A1* | 6/2011 | Li | G02B 6/3821 | 385/81 |
| 2011/0229083 A1* | 9/2011 | Dainese Jnior | G02B 6/3869 | 385/74 |
| 2012/0002926 A1* | 1/2012 | Kwasny | G02B 6/3885 | 385/78 |
| 2012/0093465 A1* | 4/2012 | Danley | G02B 6/3818 | 385/59 |
| 2012/0225408 A1* | 9/2012 | Moore | A61C 8/0033 | 433/174 |
| 2013/0129285 A1* | 5/2013 | Dong | G02B 6/36 | 385/77 |
| 2013/0156379 A1* | 6/2013 | Ott | G02B 6/36 | 385/76 |
| 2013/0163930 A1* | 6/2013 | Jian | G02B 6/36 | 385/60 |
| 2013/0183001 A1* | 7/2013 | Ott | G02B 6/3825 | 385/72 |
| 2013/0216186 A1* | 8/2013 | Ott | G02B 6/3825 | 385/70 |
| 2014/0273609 A1* | 9/2014 | Diop | H01R 13/641 | 439/489 |
| 2015/0253519 A1* | 9/2015 | Ott | G02B 6/36 | 385/134 |
| 2015/0260922 A1* | 9/2015 | Ott | G02B 6/3825 | 385/72 |
| 2015/0260925 A1* | 9/2015 | Ott | G02B 6/3825 | 15/104.8 |
| 2017/0054253 A1* | 2/2017 | Diop | H01R 13/641 | |

* cited by examiner

OPTICAL FIBER CONNECTOR

RELATED APPLICATION

The present application is based on and claims priority to Taiwanese Application Number 105139463, filed Nov. 30, 2016, the disclosure of which is hereby incorporated by reference herein in its entirety.

BACKGROUND

1 Technical Field

The disclosure relates to an optical fiber connector, and more particularly, to an optical fiber connector used to connect multiple optical fibers or ribbon fibers.

2. Description of the Related Art

Recently, the optical fiber has been widely used as signal transmission media because of its high bandwidth and low loss nature. Optical fiber connectors are an essential part of substantially all optical fiber communication systems. Optical fiber connectors are known in which each half of the connector includes a ferrule in which a plurality of optical fibers are terminated. The ferrule is mounted in a housing with a small amount of free play, and is biased by a spring into a forward position in the housing. The outer end face of the ferrule is exposed for face to face contact with the ferrule end face in the mating opposite half of the connector. Each fiber is terminated at a respective contact face at the outer end of the respective ferrule, and the optical contact faces engage one another to provide optical communication between the connector halves when mated together. The arrangement is such that the ferrules will be moved back slightly when the connection is made, compressing the biasing springs and ensuring a good optical contact between the fiber end faces. This type of optical fiber connector can connect a ribbon fiber containing up to 48 fibers.

One problem with known connectors for connecting a plurality of optical fibers is potential misalignment, side loading and torque in the connection. One reason for this is that the spring end acting on the inner end face of the ferrule does not present a flat surface, and thus may tend to apply some side loading or torque to the ferrule.

Accordingly, there exists a need to provide a solution to solve the aforesaid problems.

SUMMARY

The present disclosure provides an optical fiber connector containing a multifiber ferrule and a spring seat that has tooth portions provided with respective curved outer-surfaces for applying a biasing force to the ferrule in the longitudinal direction without introducing a moment about a lateral axis.

In one embodiment, the optical fiber connector of the present disclosure includes a fiber ferrule, a coil spring, a spring seat and a spring push. The fiber ferrule has at least one guide pin hole for receiving a guide pin to align the fiber ferrule with a mating fiber ferrule. The guide pin hole defines an axis. The coil spring has a front end, a rear end and a middle section between the front end and the rear end. The coil spring further has a first opening formed within the front end. The spring seat has opposing front and rear surfaces, wherein the front surface comes in contact with the ferrule. A second opening is formed within the rear surface. The second opening has two opposing first sides and two opposing second sides, wherein the first sides connect with the second sides. The spring seat further includes two first tooth portions extending from the rear surface into the first opening of the coil spring. The first tooth portions are respectively positioned by the first sides of the second opening, wherein the first tooth portions has a top and a bottom fixed on the rear surface. The first tooth portion further has a first inner side surface and a first outer side surface opposed to the first inner side surface, wherein the two first inner side surfaces are positioned to face each other. The two first outer side surfaces are curved and shaped in such a manner that inner edges of the first opening at the front end of the coil spring are able to slide thereon and the coil spring is still able to apply a biasing force to the spring seat in the axial direction when the coil spring buckles. The spring push is positioned to push the coil spring toward the spring seat.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
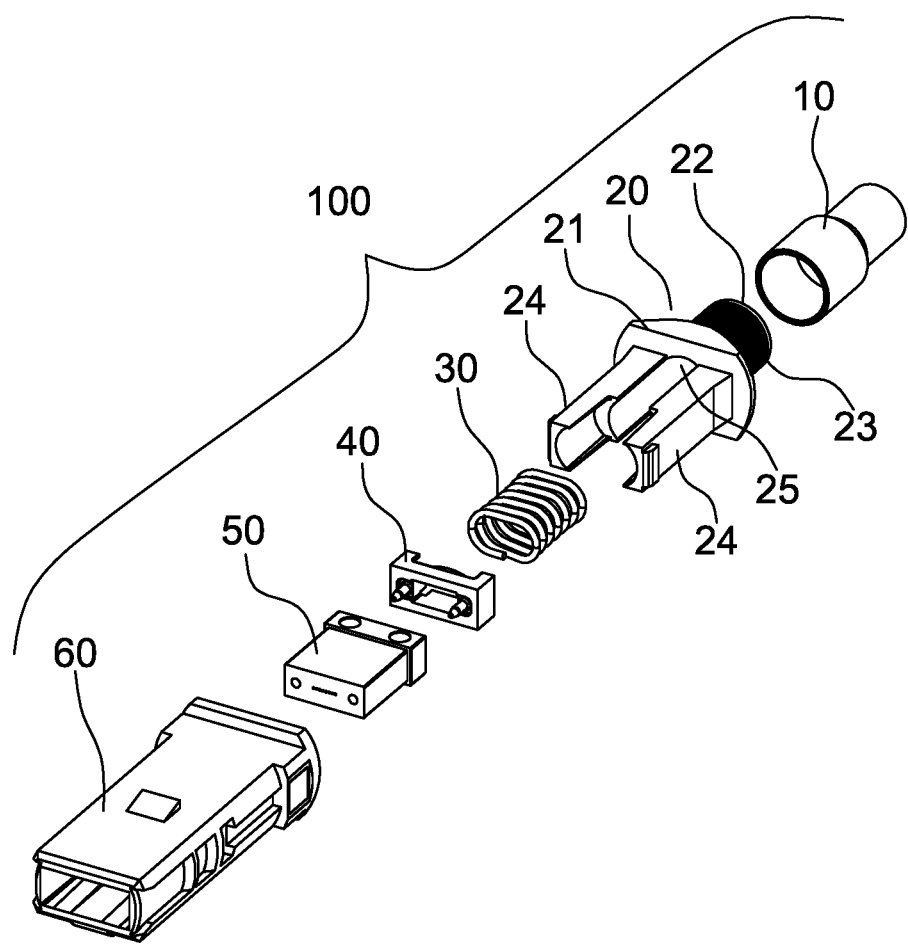
FIG. 1 is an exploded view of the optical fiber connector of the present disclosure.
Figure 2A:
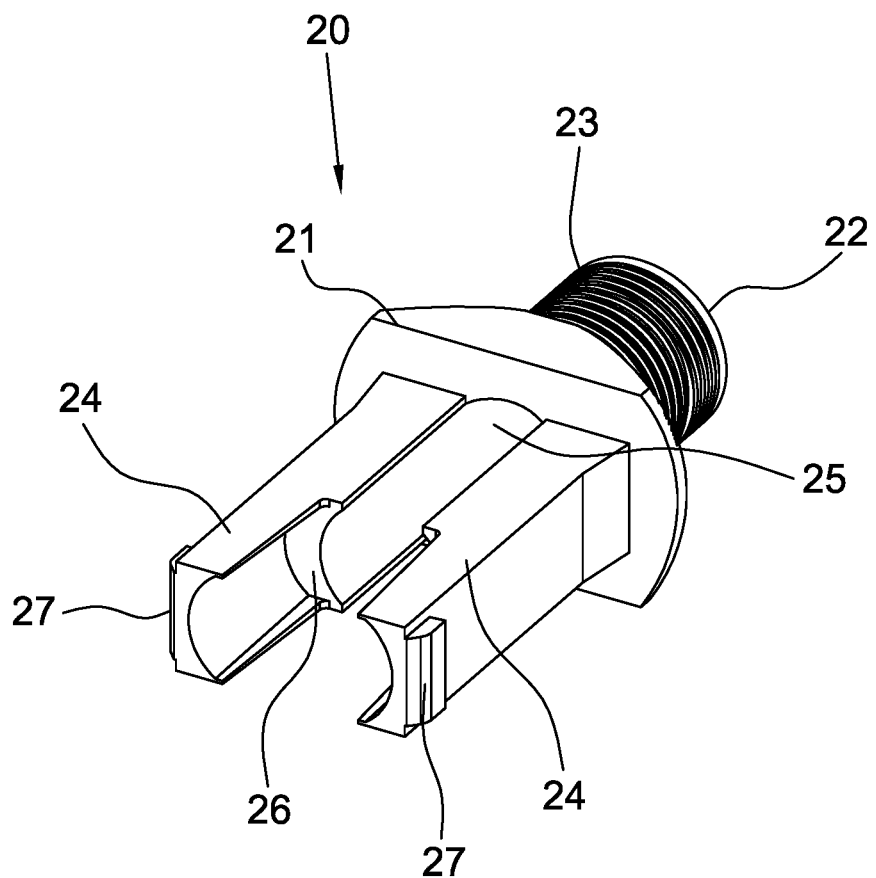
FIG. 2a is an elevated perspective view of the spring push of the optical fiber connector of the present disclosure.
Figure 2B:
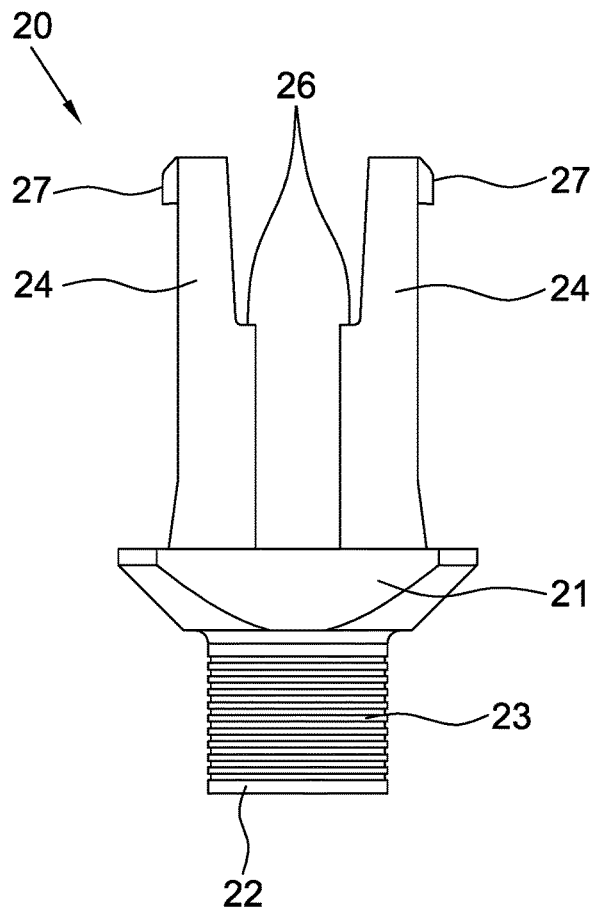
FIG. 2b is a side view of the spring push of the optical fiber connector of the present disclosure.
Figure 2C:
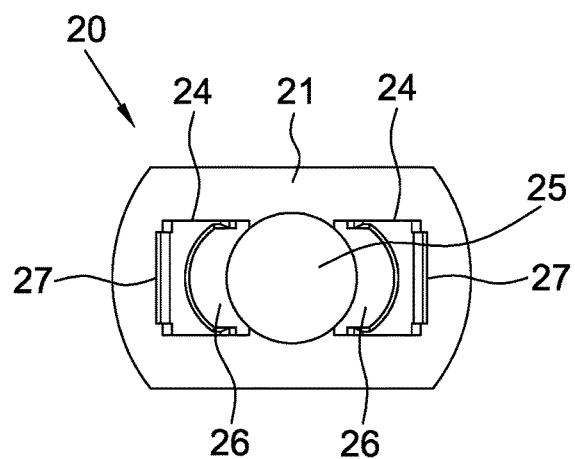
FIG. 2c is another side view of the spring push of the optical fiber connector of the present disclosure.

Reference is made to FIG. 1, the optical fiber connector 100 according to the present disclosure may be an MPO type optical fiber connector and includes a crimp ring 10, a spring push 20, a spring 30, a spring seat 40, a ferrule 50 and a housing 60

Reference is made to FIGS. 1 and 2a to 2c, the spring push 20 of the present disclosure may be constructed of plastics by an injection molding process and include a rearward portion 22 and a forward portion 21 extends forward from the rearward portion 22 in a lengthwise direction. The rearward portion 22 defines a crimp body 23 such that the crimp ring 10 can secure the strength members of an optical fiber cable (not shown), for example, Kevlar fibers to the outer surfaces of the crimp body 23. Two flexible arms 24 provided on the spring push 20 depend lengthwise and forward from the forward portion 21. The respective flexible arm 24 has opposing inner and outer surfaces, wherein the two inner surfaces of the two flexible arms 24 are positioned to face each other. An opening 25 extends lengthwise through the spring push 20 from the rearward portion 22 to the forward portion 21. The opening 25 is located between the roots of the respective flexible arms 24 at the forward portion 21. Two steps 26 are formed on the inner surfaces of the flexible arms 24, respectively. The steps 26 are planar and transverse to the lengthwise direction for making contact with the rear end of the spring 30. In addition, engagement protrusions 27 are respectively formed on outer surfaces of the flexible arms 24.

Figure 3A:
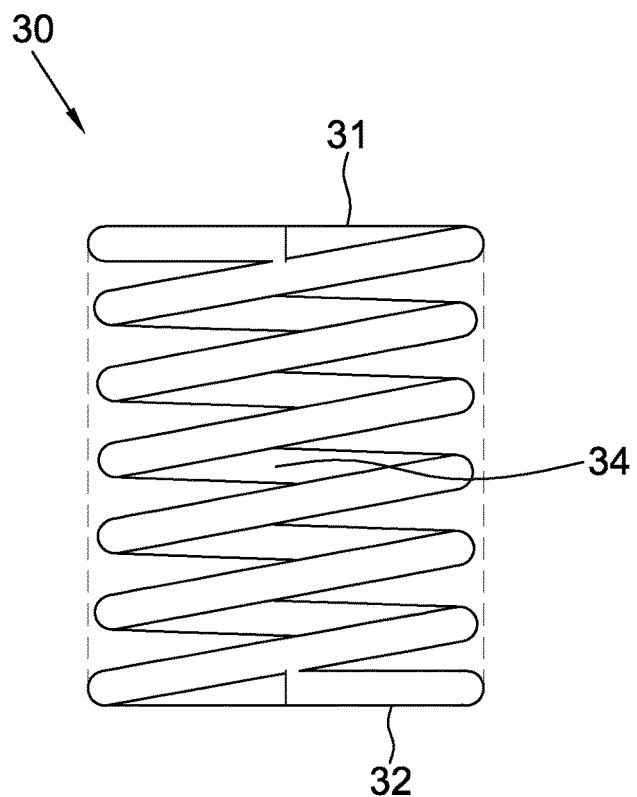
FIG. 3a is a side view of the spring of the optical fiber connector of the present disclosure, wherein the dashed lines indicate that the spring is narrower at the middle section than at two opposing ends.
Figure 3B:
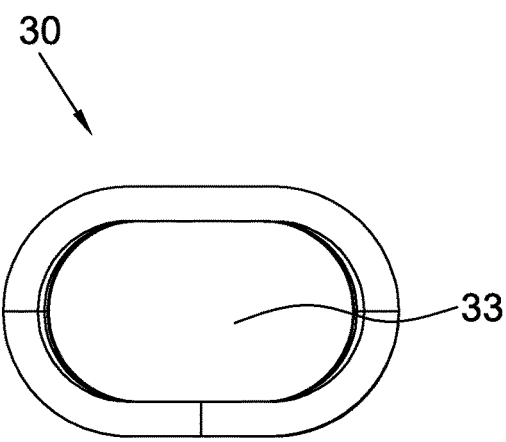
FIG. 3b is another side view of the spring of the optical fiber connector of the present disclosure.
Figure 4A:
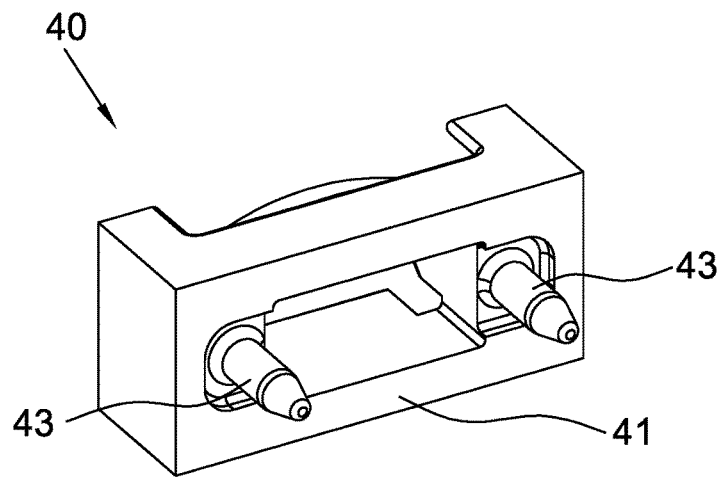
FIGS. 4a to 4c are different elevated perspective views of the spring seat of the optical fiber connector of the present disclosure.
Figure 4B:
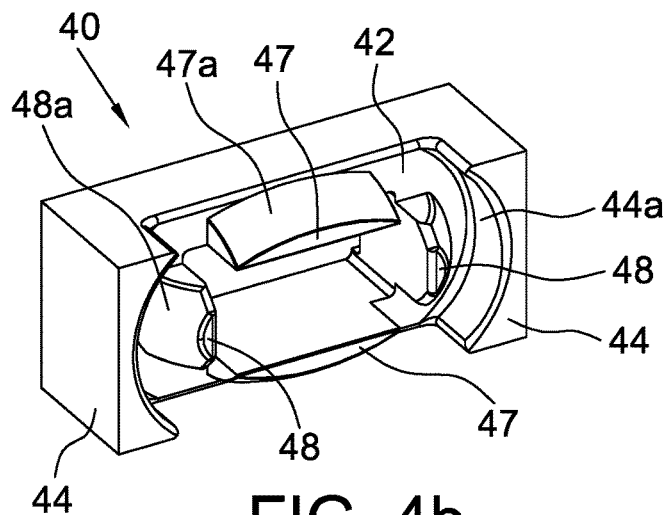
Figure 4C:
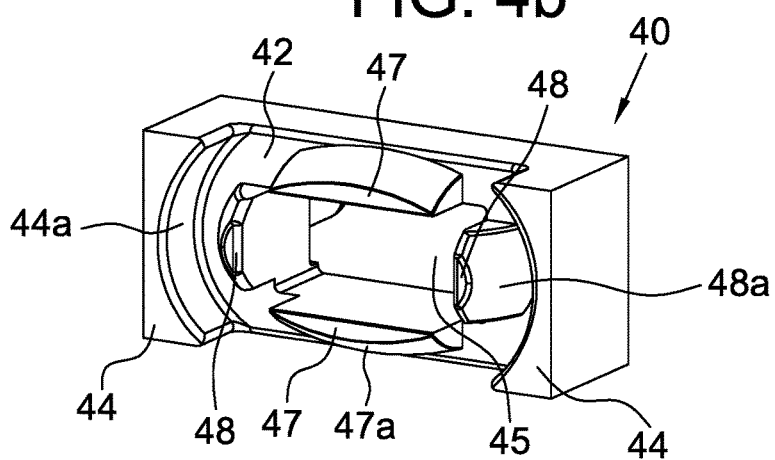

Reference is made to FIGS. 1 and 3a to 3b, the spring 30 of the present disclosure may be a coil spring and extend in the lengthwise direction. The spring 30 has a front end 31, a rear end 32 and a middle section 34 positioned between the front end 31 and the rear end 32. The rear end 32 of the spring 30 is configured to make contact with the steps 26 of the spring push 20. An opening 33 extends lengthwise through the spring 30 from the rear end 32 to the front end 31 and may be in communication with the opening 25 of the spring push 20 when the spring 30 comes into contact with the spring push 20 at the steps 26. The spring 30 may define different cross-sectional areas along its length. These cross-sectional areas are enclosed areas of the spring 30 perpendicular to the lengthwise direction of the spring 30 and may be circular, oval or other non-circular shape. The cross-sectional areas of the spring 30 may have the same or different sizes and shapes. In one embodiment, the cross-sectional areas at the middle section 34 are smaller than the cross-sectional areas located at both the front and rear ends 31, 32 as shown in FIG. 3a. In addition, the cross-sectional areas at the middle section 34 have the same size and shape. In other words, the spring 30 has a uniform width at its middle section 34.

Reference is made to FIGS. 1 and 4a to 4c, the spring seat 40 of the present disclosure may be constructed of plastics by an injection molding process and includes a body substantially having a rectangular hollow cross-section. The spring seat 40 has a front surface 41 and an opposed rear surface 42. A pair of guide pins 43 extends lengthwise from the front surface 41 and a pair of restricting walls 44 extends backward from the rear surface 42. The two restricting walls 44 are positioned to face each other and the respective inner side surfaces thereof define concave surfaces 44a. A rectangular opening 45 extends lengthwise through the spring seat 40 from the rear surface 42 to the front surface 41. Two pairs of tooth portions 47, 48 extend from the rear surface 42 of the spring seat 40, wherein the tooth portions 47 are positioned to face each other and the tooth portions 48 are positioned to face each other and directly face respectively the restricting walls 44. The tooth portions 47, 48 are positioned beside four sides of the rectangular opening 45 respectively to enclose the opening 45. In one embodiment, the tooth portions 47, 48 may connect together to form an annular tooth portion. In another embodiment, the tooth portions 47, 48 are separated from each other and each of them has an inner side surface and an opposed outer side surface. The inner side surfaces of the tooth portions 47, 48 are planar and perpendicular to the rear surface 42. The inner side surfaces of the tooth portions 47 are positioned to directly face each other and the inner side surfaces of the tooth portions 48 are positioned to directly face each other. The outer side surfaces of the tooth portions 47 define respective curved surfaces 47a and the outer side surfaces of the tooth portions 48 define respective curved surfaces 48a. The curved surfaces 48a are arranged to face the surfaces 44a of the restricting walls 44 respectively. In one embodiment, the curved surfaces 47a, 48a are arc shaped. The respective tooth portions 47, 48 have a thickness defined between the inner side surface and outer side surface and the thickness is different from respective bottom to top. The respective curved surfaces 47a, 48a define an inclination angle with respect to the rear surface 42 and the inclination angle may be different at different positions. Specifically, the curved surfaces 47a, 48a are convex and steepest at respective bottoms and become less slanted upwards. In other words, the inclination angles of the curved surfaces 47a, 48a are largest at respective bottoms and gradually decrease toward respective tops. Therefore, the tooth portions 47, 48 are thicker at respective bottoms than at respective tops. The tooth portions 47, 48 have respective tapered cross-sections. Furthermore, the tooth portions 47, 48 may have horizontal tops.

Figure 5A:
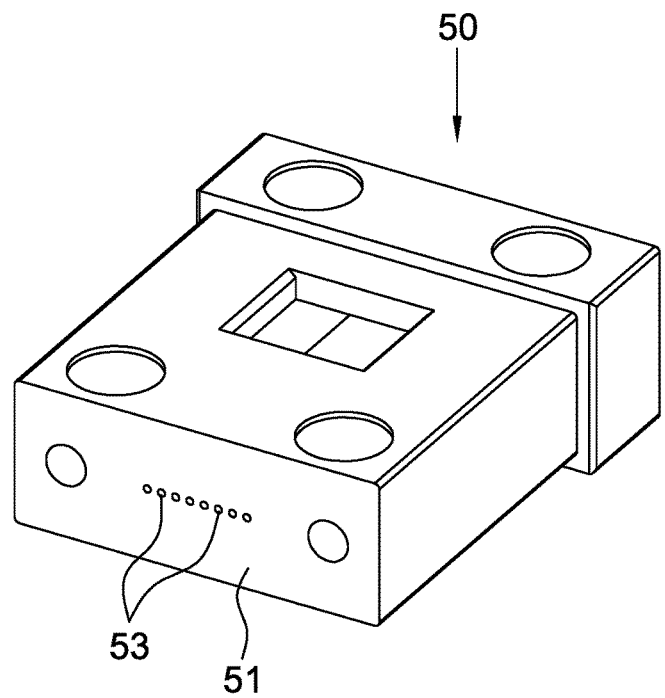
FIG. 5a is an elevated perspective view of the ferrule of the optical fiber connector of the present disclosure.
Figure 5B:
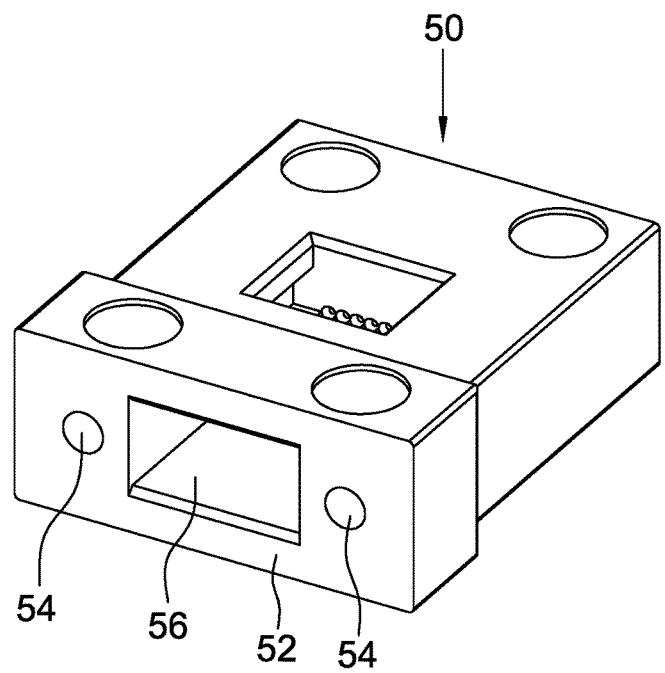
FIG. 5b is another elevated perspective view of the ferrule of the optical fiber connector of the present disclosure.

Reference is now made to FIGS. 5a and 5b, which illustrate the ferrule 50 of the present disclosure. The ferrule 50 may be an MT-type multi-fiber ferrule and substantially have a rectangular cross section. The ferrule 50 has a body extending lengthwise and opposing front and rear surfaces 51, 52 on the body. Two circular guide pin holes 54 open lengthwise through the rear surface 52 and are configured to respectively receive the guide pins 43 of the spring seat 40. A rectangular opening 56 is formed through the rear surface 52 and located between the guide pin holes 54. The opening 56 extends lengthwise from the rear surface 52 toward the front surface 51. The ferrule 50 further defines a plurality of bores 53 that open lengthwise through the front surface 51 and are in communication with the opening 56. The bores 53 are arranged in a laterally extending linear row for receiving the end portions of respective optical fibers of a ribbon fiber that can be inserted into the opening 56 from the rear surface 52.

Figure 6:
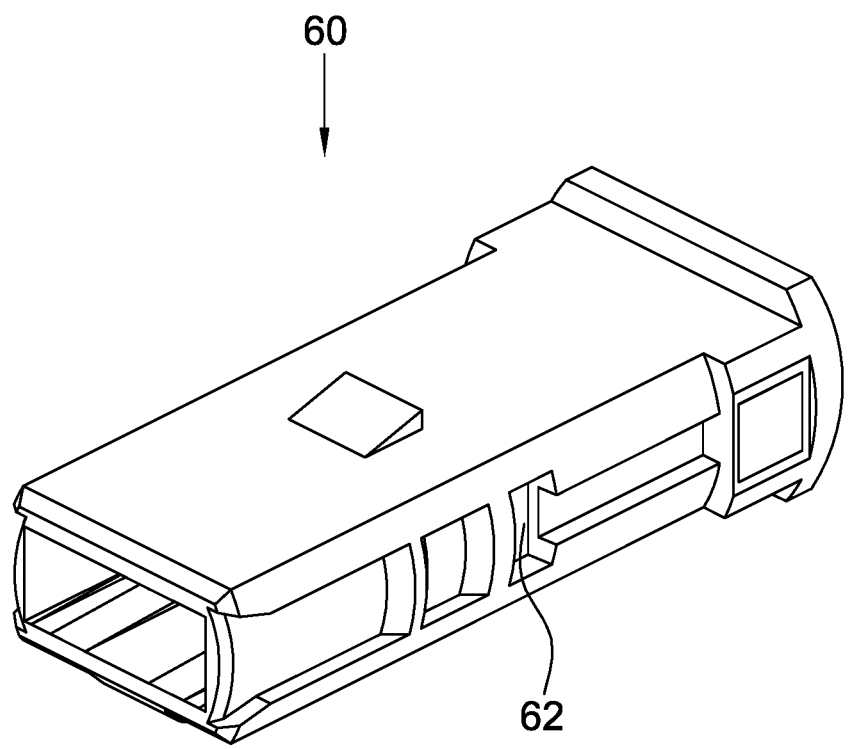
FIG. 6 is an elevated perspective view of the housing of the optical fiber connector of the present disclosure.

Reference is now made to FIG. 6, which illustrates the housing 60 of the present disclosure. The housing 60 may be constructed of plastics by an injection molding process. The housing 60 substantially has a rectangular hollow cross-section. The housing 60 extends lengthwise or axially and has an accommodation room defined by four continuous walls. The accommodation room has a front opening and an opposed rear opening in the lengthwise or axial direction. Engagement openings 62 are respectively formed through two of the four walls for engaging the engagement protrusions 27 of the spring push 20.

Figure 7:
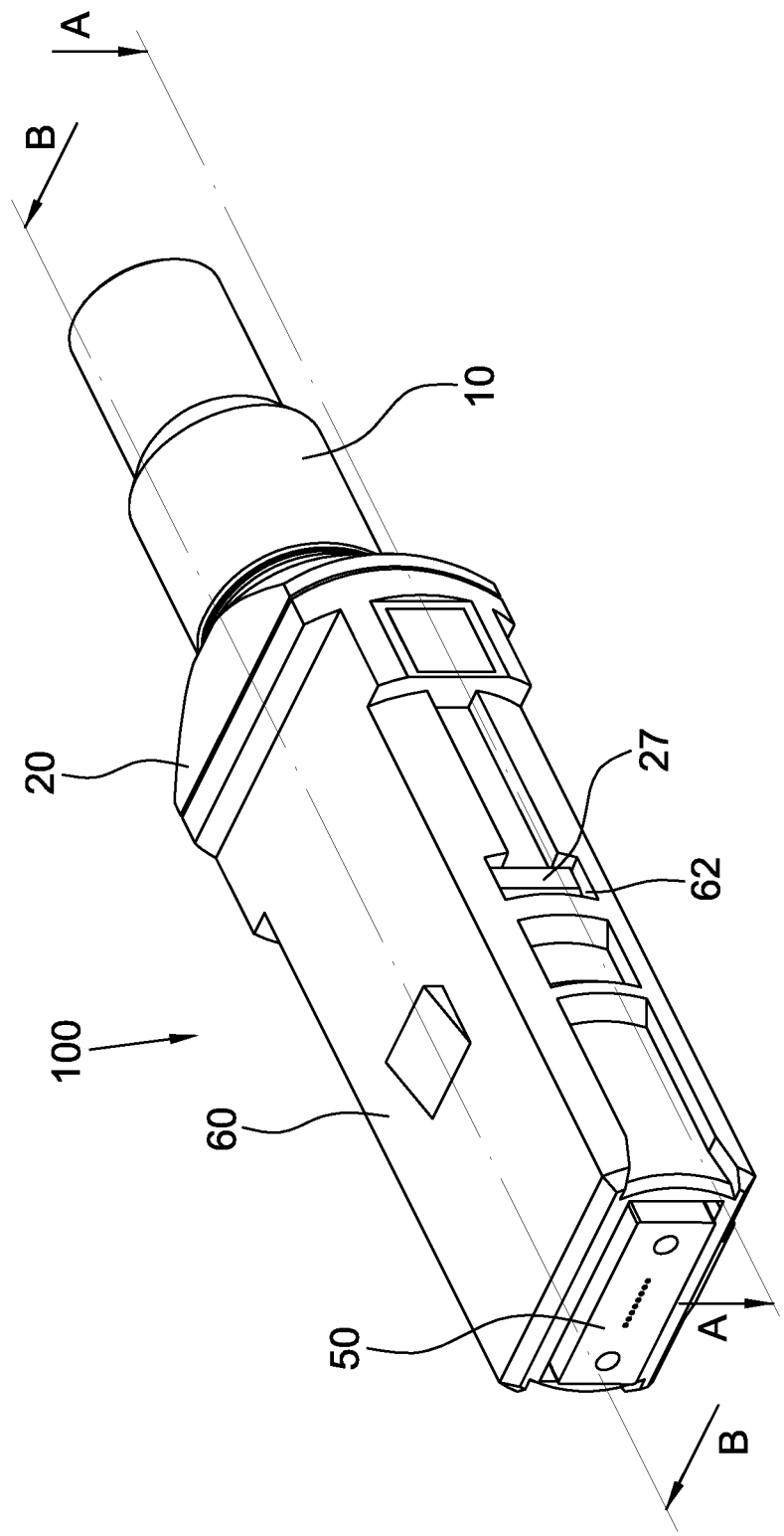
FIG. 7 is an elevated perspective view of the optical fiber connector of the present disclosure.
Figure 8A:
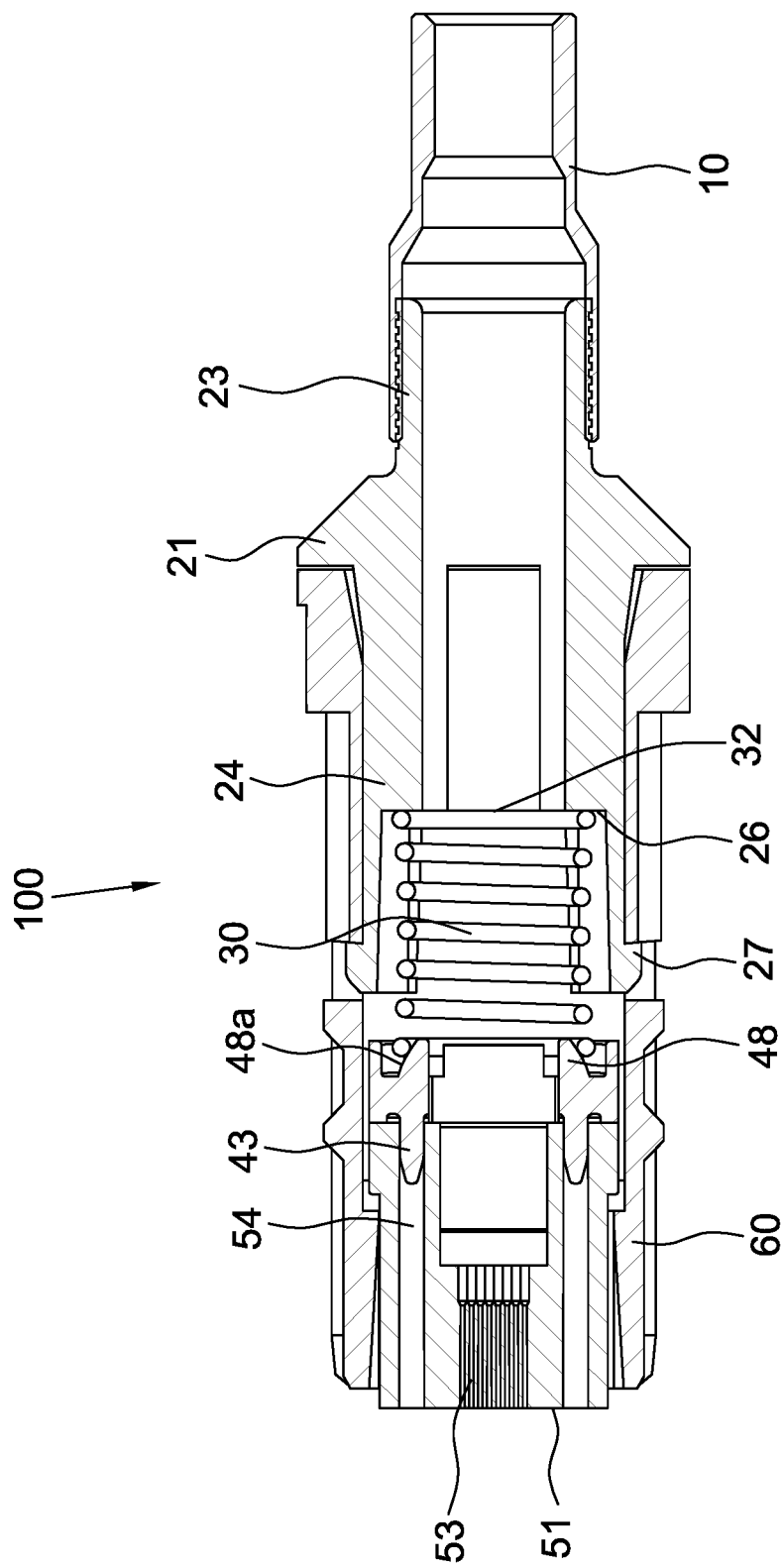
FIG. 8a is a cross-sectional view taken along line A-A of FIG. 7.
Figure 8B:
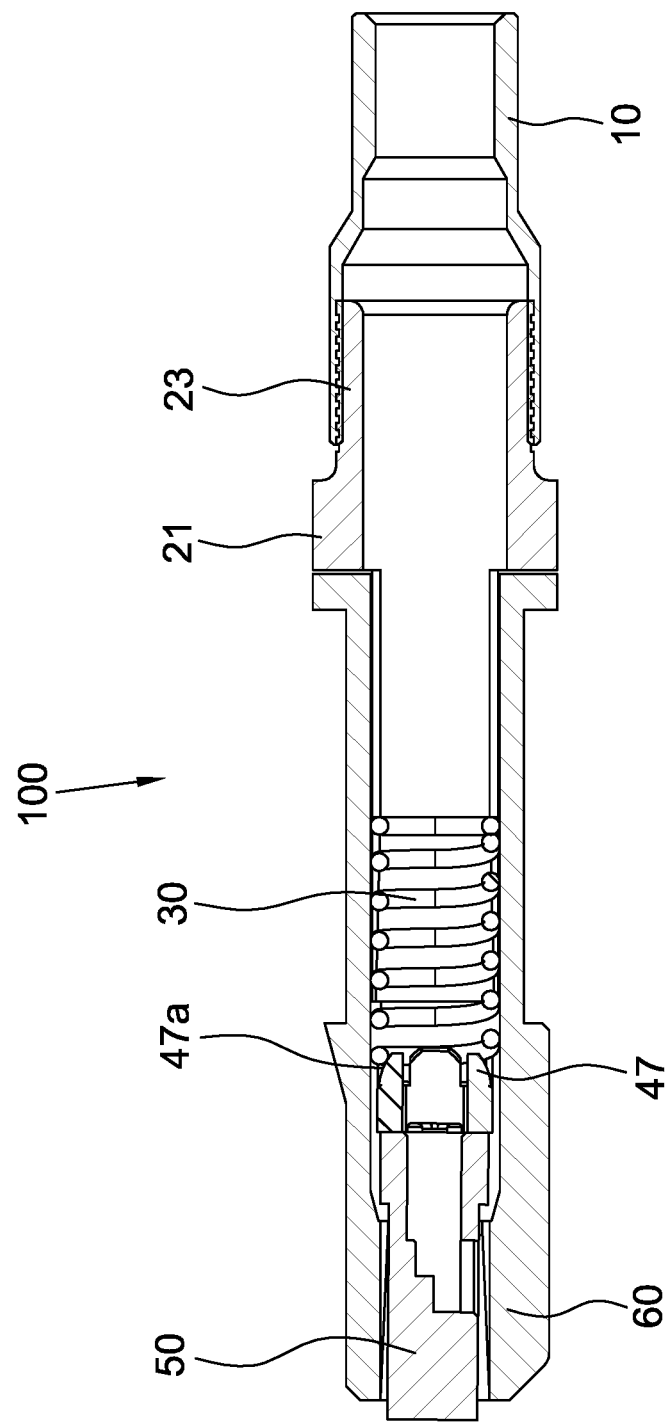
FIG. 8b is a cross-sectional view taken along line B-B of FIG. 7.

Reference is made to FIGS. 7 and 8a to 8b, the crimp ring 10 is positioned to clamp the crimp body 23 of the spring push 20 in the optical fiber connector 100 of the present disclosure. The forward portion 21 of the spring push 20 has a front end surface coming into contact with the rear end surface of the housing 60. The flexible arms 24 are inserted into the housing 60 from the rear opening and the engagement protrusions 27 on the flexible arms 24 come into engagement with the respective engagement openings 62 accordingly. The spring push 20 is, at its steps 26 in contact with the rear end 32 of the spring 30 and therefore pushes the spring 30 forward toward the spring seat 40 to have the front end 31 of the spring 30 press upon the spring seat 40. At this state the front end 31 of the spring 30 comes to being positioned between the restricting walls 44. The tooth portions 47, 48 are inserted into the opening 33 of the spring 30 from the front end 31 and the guide pins 43 of the spring seat 40 are inserted into the respective guide pin holes 54 on the rear surface 52 of the ferrule 50. The ferrule 50 is pushed into the housing 60 by the spring 30 and the front surface 51 thereof protrudes from the front opening of the housing 60.

In the optical fiber connector 100 of the present disclosure a ribbon fiber (not shown) may go through the crimp ring 10, spring push 20, spring 30 and spring seat 40 and then insert into the ferrule 50 from the opening 56. The bores 53 on the front surface 51 of the ferrule 50 receive the end portions of the respective optical fibers of the ribbon fiber and these end portions of the optical fibers are flush with the front surface 51 of the ferrule 50. The optical fiber connector 100 of the present disclosure may be inserted into a counterpart adapter and the counterpart adapter may be a known optical fiber adapter. The optical fiber connector 100 of the present disclosure may couple with another optical fiber connector of the same type.

Figure 9A:
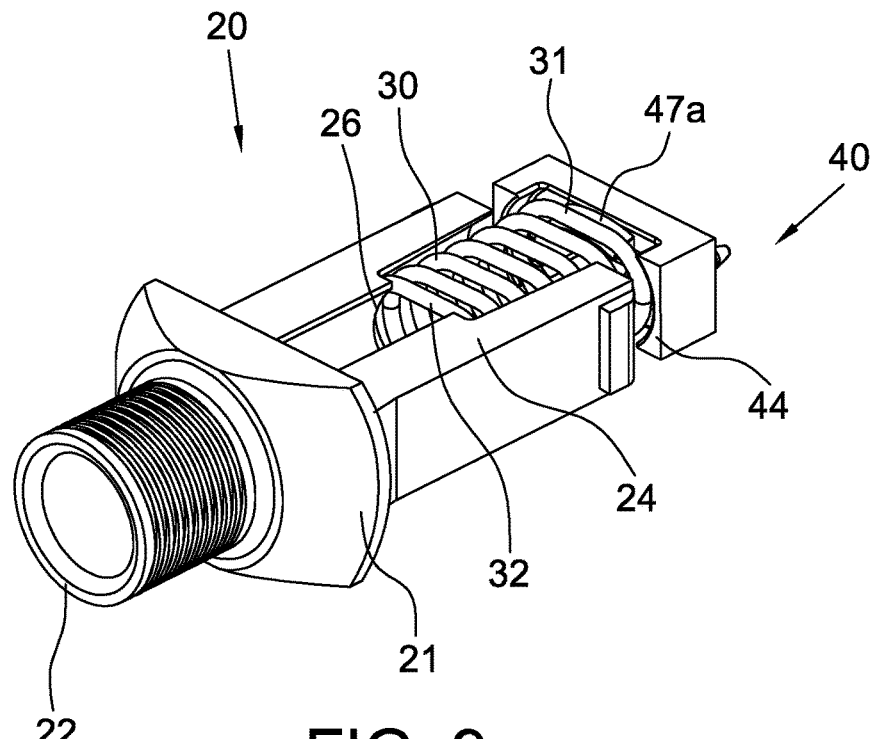
FIG. 9a is an elevated perspective view illustrating that the spring push, spring and spring seat of the optical fiber connector of the present disclosure is assembled together.
Figure 9B:
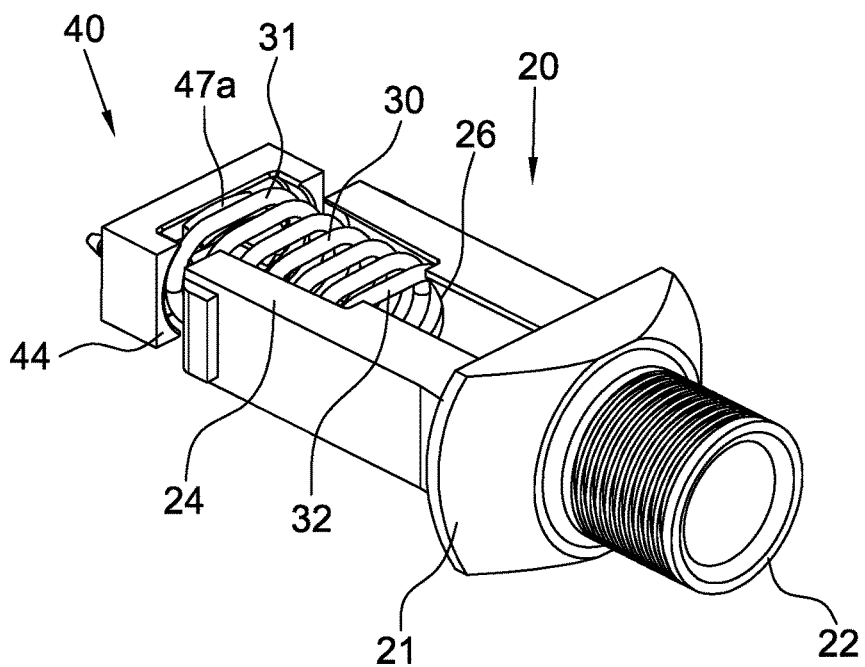
FIG. 9b is another elevated perspective view illustrating that the spring push, spring and spring seat of the optical fiber connector of the present disclosure is assembled together.

Reference is made to FIGS. 9a and 9b, the rear end 32 of the spring 30 is positioned between the two flexible arms 24 of the spring push 20 and the front end 31 of the spring 30 is positioned between the two restricting walls 44 of the spring seat 40. The steps 26 of the spring push 20 come in contact with the rear end 32 of the spring 30 to push the spring 30 forward toward the spring seat 40 such that the curved surfaces 47a, 48a of the tooth portions 47, 48 come in contact with the front inner edge of the opening 33 of the spring 30.

According to the optical fiber connector 100 of the present disclosure the tooth portions 47, 48 are thicker at respective bottoms than at respective tops. The curved surfaces 47a, 48a are shaped to prevent the spring 30 from making direct contact with the rear surface 42 of the spring seat 40.

Figure 10:
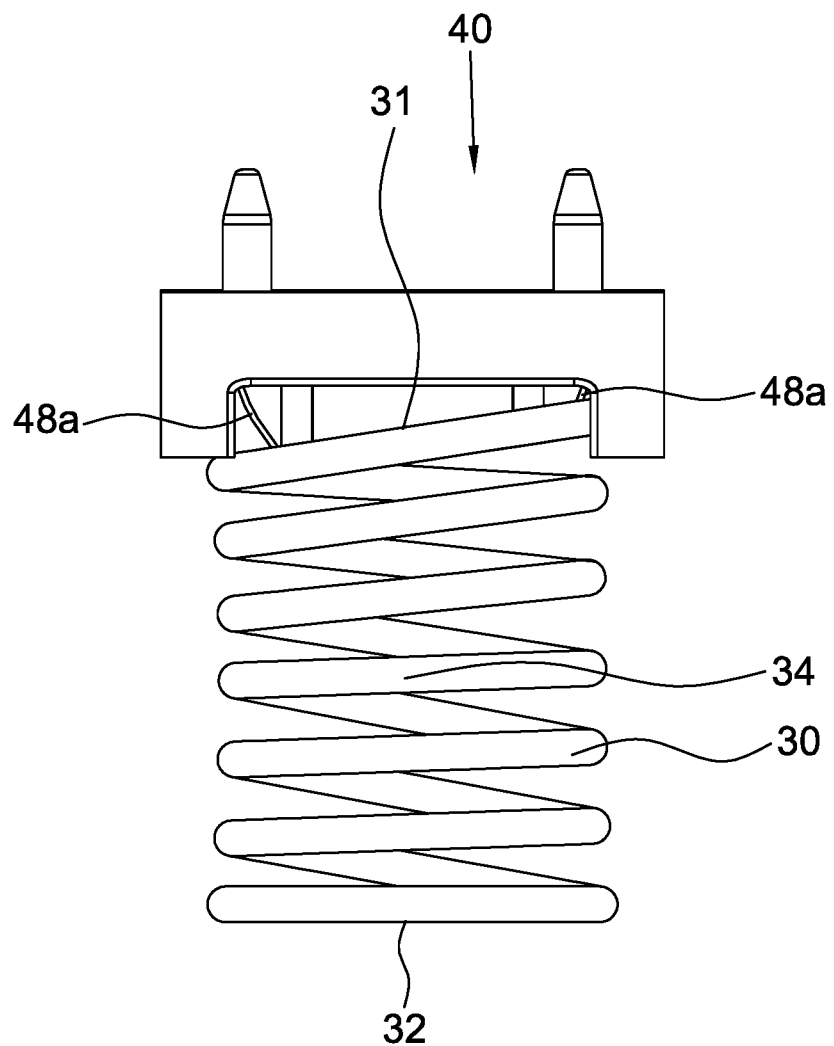
FIG. 10 illustrates how the spring exerts a biasing force on the spring seat when the spring buckles.

Reference is made to FIG. 10, when the spring 30 buckles due to subjection to side loading or torque, one side at the front end 31 will move backward and the inner edge thereof therefore slides on one of the curved surfaces 48a. The tooth portions 47 have the functions the same as the functions of the tooth portions 48. When the spring 30 buckles, the front end 31 of the spring 30 will not make direct contact with the rear surface 42 of the spring seat 40. With such design the spring 30 may apply a biasing force to the spring seat 40 in the longitudinal or axial direction without introducing a moment about a lateral axis even though the spring 30 buckles. Therefore, the ferrule 50 will not deviate from the longitudinal direction to cause a misalignment. The optical fiber connector 100 of the present disclosure may make a good optical contact with a mating optical fiber connector accordingly.

According to the present disclosure the wider opening 33 at the front end 31 of the spring 30 may have the spring 30 not subject to buckle at its front section when a side loading or torque exerts on it. This may also prevent the ferrule 50 from deviation.

Although the present disclose has been explained in detailed with MPO type optical fiber connector, it will be appreciated that the optical fiber connector of the present disclosure may include other types of optical fiber connectors.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber connector for inserting into an optical fiber adapter, the optical fiber connector comprising:
    a fiber ferrule having at least one guide pin hole for receiving a guide pin to align the fiber ferrule with a mating fiber ferrule, the guide pin hole defining an axis;
    a coil spring having a front end, a rear end and a middle section between the front end and the rear end, the coil spring further having a first opening formed within the front end;
    a spring seat having opposing front and rear surfaces, the front surface being in contact with the ferrule, wherein a second opening is formed within the rear surface, the second opening has two opposing first sides and two opposing second sides, the first sides connect with the second sides, the spring seat further comprising:
        two first tooth portions extending from the rear surface into the first opening of the coil spring, the first tooth portions being respectively positioned by the first sides of the second opening, wherein the first tooth portion has a top and a bottom fixed on the rear surface, the first tooth portion further has a first inner side surface and a first outer side surface opposed to the first inner side surface, the two first inner side surfaces are positioned to face each other, the first outer side surface is inclined and a position at the first outer side surface defines a first inclination angle with respect to the rear surface of the spring seat, the first inclination angle decreases from the bottom toward the top of the first tooth portion, the two inclined first outer side surfaces are shaped in such a manner that inner edges of the first opening at the front end of the coil spring are able to slide thereon and the coil spring is still able to apply a biasing force to the spring seat in the axial direction when the coil spring buckles; and
    a spring push positioned to push the coil spring toward the spring seat.

2. The optical fiber connector as claimed in claim 1, wherein the first outer side surfaces are further shaped to prevent the coil spring from making direct contact with the rear surface of the spring seat.

3. The optical fiber connector as claimed in claim 1, wherein the spring seat further comprising:
    two second tooth portions extending from the rear surface into the first opening of the coil spring, the second tooth portions being respectively positioned by the second sides of the second opening, wherein the second tooth portion has a top and a bottom fixed on the rear surface, the second tooth portion further has a second inner side surface and a second outer side surface opposed to the second inner side surface, the two second inner side surfaces are positioned to face each other, the second outer side surface is inclined and a position at the second outer side surface defines a second inclination angle with respect to the rear surface of the spring seat, the second inclination angle decreases from the bottom toward the top of the second tooth portion, the two inclined second outer side surfaces are shaped in such a manner that inner edges of the first opening at the front end of the coil spring are able to slide thereon and the coil spring is still able to apply a biasing force to the spring seat in the axial direction when the coil spring buckles.

4. The optical fiber connector as claimed in claim 3, wherein the second outer side surfaces are further shaped to prevent the coil spring from making direct contact with the rear surface of the spring seat.

5. The optical fiber connector as claimed in claim 2, wherein the first tooth portion has a thickness defined between the first inner side surface and the first outer side surface, the first tooth portion is thicker at the bottom than at the top.

6. The optical fiber connector as claimed in claim 4, wherein the second tooth portion has a thickness defined between the second inner side surface and the second outer side surface, the second tooth portion is thicker at the bottom than at the top.

7. The optical fiber connector as claimed in claim 1, wherein the spring push comprising:
   a rearward portion;
   a forward portion extending from the rearward portion;
   two flexible arms extending from the forward portion; and
   two steps respectively formed at the flexible arms to make contact with the rear end of the coil spring.

8. The optical fiber connector as claimed in claim 1, wherein the spring seat further comprising:
   two restricting walls positioned on the rear surface to respectively face the first outer side surfaces.

9. The optical fiber connector as claimed in claim 1, wherein the spring is wider at the front end than at the middle section.

10. The optical fiber connector as claimed in claim 1, wherein the spring is wider at the rear end than at the middle section.

* * * * *